United States Patent [19]

Charkey et al.

[11] Patent Number: 5,023,155
[45] Date of Patent: Jun. 11, 1991

[54] NICKEL ELECTRODE FOR ALKALINE BATTERIES

[75] Inventors: Allen Charkey, Brookfield, Conn.; Stanley Januszkiewicz, South Hadley, Mass.

[73] Assignee: Energy Research Corporation, Danbury, Conn.

[21] Appl. No.: 431,998

[22] Filed: Nov. 6, 1989

[51] Int. Cl.$^5$ ............................................. H01M 4/52
[52] U.S. Cl. .................................. 429/223; 252/182.1
[58] Field of Search ......................... 429/223; 252/82.1

[56] References Cited

U.S. PATENT DOCUMENTS 4,029,132  6/1977  Jackovitz ..................... 429/223 X
4,337,124  6/1982  Joaskalick ................... 204/56.1 X
4,603,094  7/1986  Yasuda ............................. 429/91
4,605,604  8/1986  Pollack et al. ..................... 429/116

FOREIGN PATENT DOCUMENTS 343408  11/1989  European Pat. Off. ............ 429/223

OTHER PUBLICATIONS

Nichols et al., Chemical Abstracts vol. 103 No. 149486, 1985.

Primary Examiner—Stephen J. Kalafut
Attorney, Agent, or Firm—Robin, Blecker, Daley & Drsicoll

[57] ABSTRACT

A nickel electrode comprising a conductive support and a layer on said support comprising a conductive diluent and an active material including nickel hydroxide containing boron.

11 Claims, 3 Drawing Sheets

NICKEL ELECTRODE FOR ALKALINE BATTERIES

BACKGROUND OF THE INVENTION

This invention relates to electrodes for use in alkaline storage batteries and more particularly to cathode or positive electrodes which contain nickel hydroxide as the active material.

Nickel electrodes of this type are commonly employed in batteries having anodes containing Cd, Zn, $H_2$ and other electrodes also contain graphite as a conductive diluent to impart electronic conductivity to the active material. The conductive graphite diluent is used in place of the more conventional sintered nickel plaque structure and results in a lighter weight and less costly battery construction.

However, there is one significant drawback to using graphite diluent in nickel electrodes. The electrodes exhibit lower performance at high rates of discharge as compared with the more conventional electrodes using sintered nickel plaques. Lower performance at rates of discharge higher than, for example, the 1-hour rate (i.e. 50 MA/cm$^2$), are the result of the higher internal resistance exhibited by the electrodes. Higher internal resistance is caused, in part, by the poorer conductivity of the $Ni(OH)_2$ to graphite particle contact, especially after the electrode is more than 50% discharged. This poorer conductivity manifests itself by increasing electrode polarization and lowering active material utilization particularly during high rate discharges.

There have been attempts to improve the high rate performance of nickel electrodes employing graphite diluents. One attempt involved the admixing or coating of a conductive metallic powder (e.g. Ni, Ag, Mn, etc.) on the graphite particles to improve their overall electrode conductivity. However, it has been found that these metallic coatings form oxide layers which in time also result in a lower high rate discharge performance for the electrode.

Another attempt at improving these electrodes involved trying to improve the conductivity of the $Ni(OH)_2$ active material by doping the material with $Li^+$, $Al^{+3}$, $Mg^{+2}$ or $Mn^{+2}$ ions. This approach, however, also has resulted only in improvements of a transitory nature.

It is, therefore, an object of the present invention to provide an improved nickel electrode which exhibits lower polarization and improved active material utilization at high rates of discharge.

It is a further object of the present invention to provide a nickel electrode which contains a graphite diluent and which exhibits lower polarization and improved active material utilization for high rates of discharge.

It is yet a further object of the present invention to provide a nickel electrode which exhibits the above properties after repeated charge-discharge cycling.

It is still a further object of the present invention to provide a method for making active material for the aforementioned electrodes.

SUMMARY OF THE INVENTION

In accordance with the principles of the present invention, the above other objectives are realized in an electrode comprising a conductive support and a layer on said support formed from a graphite conductive diluent and an active material including nickel hydroxide containing boron. Preferably, the boron should be in an amount from 1-10 atom % of range for the boron is from 1-2 atom % of the atomic mass of the nickel hydroxide. The boron may be present as borate ($BO_3^{-3}$) ions or boride ($B^{+3}$) ions.

Alkaline secondary batteries employing nickel electrodes containing active material in accordance with the above, are found to exhibit discharge voltages which are 0.1 volt higher at the 10C rate than the discharge voltages exhibited by batteries which use conventional active materials. These alkaline batteries also have active material utilizations which are about 20% higher than the conventional batteries. The improved characteristics of batteries employing the electrodes of the invention are evident even after 500 deep discharge cycles. It is believed that the boron contained in the $Ni(OH)_2$ active mass promotes oxidation beyond trivalent nickel during charge with the formation of a substantial amount of tetravalent nickel resulting in improved active material conductivity. This is also evidenced by the fact that even at lower discharge rates (i.e., C/2 rate) batteries with the subject electrodes gave voltages which were 40-60 mV higher than batteries using electrodes without the boron additive.

BRIEF DESCRIPTION OF THE DRAWINGS

The above and other features and aspects of the present invention will become more apparent upon reading the following detailed description in conjunction with the attached drawings, in which.

DETAILED DESCRIPTION

Figure 1:
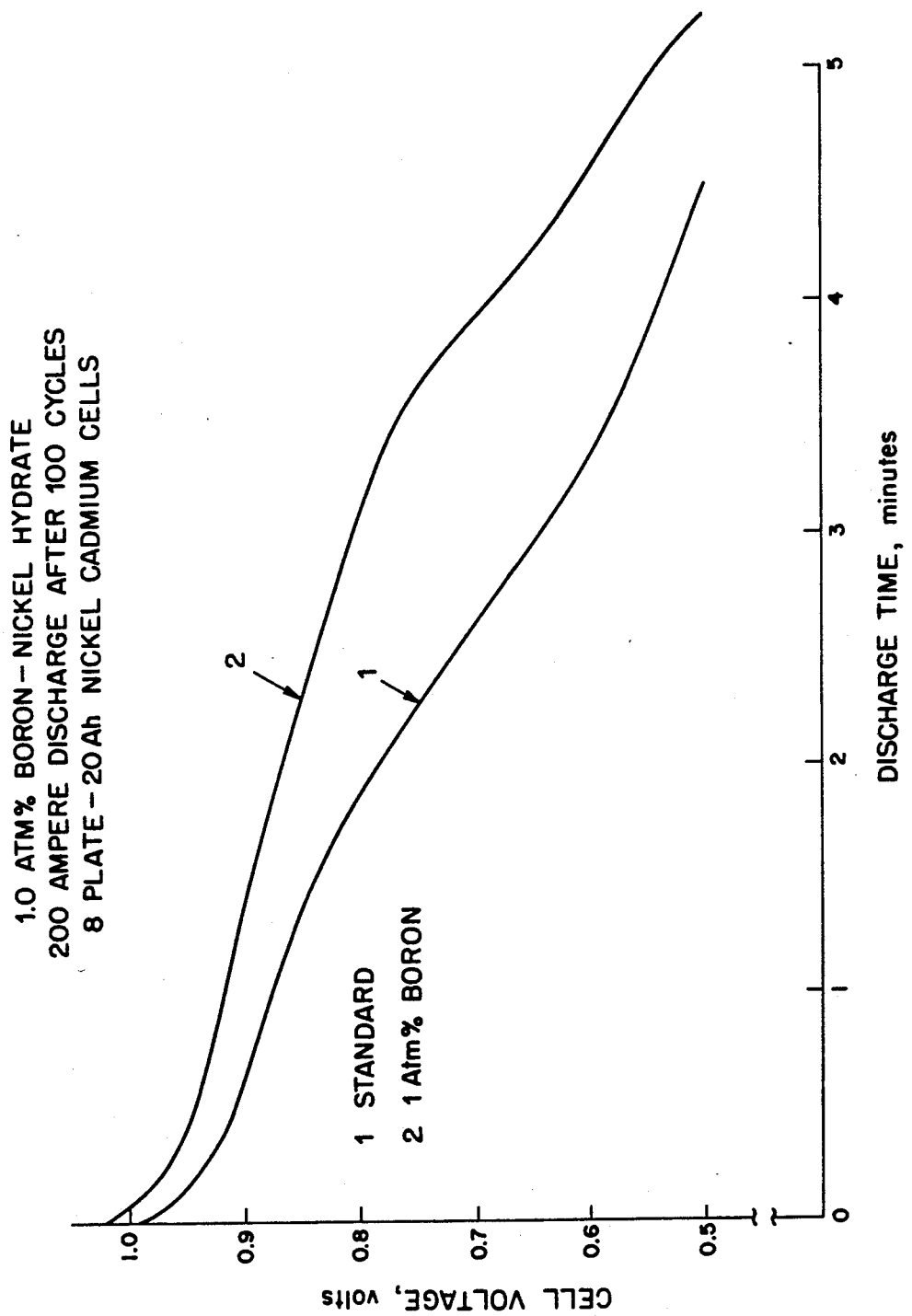
FIG. 1 shows representative discharge curves at the 10C rate after 100 cycles of operation for 2 nickel-cadmium cells, one utilizing a nickel electrode including boron in accordance with the present invention and the other a standard nickel electrode without boron.

In the present invention, a nickel electrode is formed from a nickel hydroxide material containing boron. The material is first formed into an active layer with graphite or spinel-coated graphite as the conductive diluent. The formed layer is then applied to a conductive support to complete the electrode.

The conductive support utilized in the electrode of the invention is preferably a nickel foil, although other support materials, such as, for example, nickel, copper or steel plates may be used. The graphite conductive diluent, preferably, is KS-44 manufactured by Lonza Corp. The graphite may also be spinel-coated as described in U.S. Pat. No. 4,546,068, assigned to the same assignee hereof.

The amount of boron contained in the nickel hydroxide active material is preferably 1-10% and, more preferably, 1-2 atom %, of the atomic mass of the nickel hydroxide. The boron may be present as borate ions ($BO_3^{-3}$) or boride ($B^{+3}$) ions. The borate ions may be present in the form of the following compounds: $Ni_3(BO_3)_2$ and $H_3BO_3$. It is also desirable that the nickel hydroxide include a small percentage of $Co(OH)_2$. A range of 1-5 atom % is preferable.

It is also preferable that a binder be used for the active material mixture to form the layer. A preferred binder is polytetrafluoroethylene. Other possible binders are polyethylene and neoprene latex.

In a preferred embodiment of the nickel electrodes of the invention, the electrodes are prepared using a nickel foil substrate as the conductive support. A layer is then disposed on the support. The layer is formed from active material including $Ni(OH)_2$ containing borate ions and a small percentage of $Co(OH)_2$, a double cobalt spinel coated graphite powder and a binder such as polytetrafluoroethylene (PTFE). The layer is fabricated by first mixing the latter materials and then kneading the resultant mixture to a dough-like consistency with the assistance of a non-aqueous lubricant. The kneaded mixture is then rolled to form sheets or layers which are laminated onto the nickel foil to produce the finished nickel electrodes. The resultant electrodes have a thickness in the range of 20 to 100 mils and preferably in the range of 40 to 80 mils.

The active $Ni(OH)_2$ containing the intercalated borate ions in its crystal structure is obtained by controlled chemical precipitation of $Ni(OH)_2$ from a solution of $NiSO_4.6H_2O$ boric acid, and $CoSO_4.7H_2O$. The electrodes of the invention and the manner of preparing them may be further understood by way of the following example.

Nickel hydroxide and $Co(OH)_2$ powder containing borate ions was prepared from an aqueous solution containing 9.14 moles of $NiSO_4.6H2O$, 0.139 moles $CoSO_4.7H_2O$ and 0.488 moles $H_3BO_3$ dissolved in 2 liters of deionized water. The solution was then heated to 40° C. and the hydroxides were precipitate using excess alkali. The slurry was next transferred to a drum and agitated by bubbling air through the drum; the precipitate was allowed to settle and the clear liquid was decanted. Additional hot deionized water was replenished in the drum and the agitation-decantation procedure was repeated until less than 0.5% sulfate salts were detected in the supernatant liquid. The $Ni(OH)_2$ active material was transferred to a tray and placed in an air-convected oven at through a 60 mesh (250 micron) screen. The $Ni(OH)_2$ powder was then analyzed by atomic absorption spectrometry and found to contain 1 atom percent boron most likely present as $Ni_3(BO_3)_2$.

The $Ni(OH)_2)$ containing boron was then used as the active material in forming nickel electrodes of alkaline nickel-cadmium rechargeable cells. In particular, the nickel active material containing 66% $Ni(OH)_2$, 1% boron and 3% $Co(OH)_2$ was mixed with 30% graphite and 4 percent PTFE. The mixture was then kneaded with the aid of a non-aqueous lubricant to a dough-like consistency. The dough was then rolled into strips and laminated with a pierced 0.002" thick nickel foil support having an open area of about 35 percent. Positive electrodes of about 0.08" in thickness were formed. The total mass of positive material was 140 grams.

Negative electrodes having at total mass of negative active material (cadmium oxide) of 140 grams were then also formed in a similar manner. Positive and negative electrodes for forming a 20 ampere-hour cell were then arranged in a suitable cell case and the case filled with an aqueous electrolyte containing 35 percent potassium hydroxide and 1 percent by weight lithium hydroxide. The positive and negative electrodes were separated by two layers of non-woven polyamide Pellon 0.005" thick (Pellon Corporation) and one layer of microporous polypropylene film Celgard K-306 (Celenese Corporation.

In the foregoing procedure, the graphite used was commercially available synthetic graphite powder designated KS-44 from Lonza having an average particle size of 40 microns. The PTFE used was a powder commercially available as DuPont Teflon powder NO. 6C. The non-aqueous lubricant was commercially available Shell Sol B, a petroleum solvent having an aniline point of 129° F. and a composition by volume of 65.5 percent paraffins, 32 percent napthene and 2.5 percent aromatics. The cadmium active material was a commercially available cadmium oxide powder known as ASARCO Globe Brand CdO.

The 20 ampere-hour cell fabricated in the above example was subjected to repeated discharge-recharge cycling wherein it was discharged at 10 amperes for 2 hours, to remove 20 ampere-hours of the cell capacity and was then recharged at 3.7 amperes for 6 hours which restored 22.2 ampere-hours. Approximately a 10 percent overcharge is required to restore 100 percent of the nickel electrode capacity, since its charging reaction occurs with the simultaneous evolution of oxygen during the latter portion of the charge. Every 100 cycles the cell was given a high rate capacity discharge at 200 amperes to a cut-off voltage of 0.5 volts.

Figure 2:
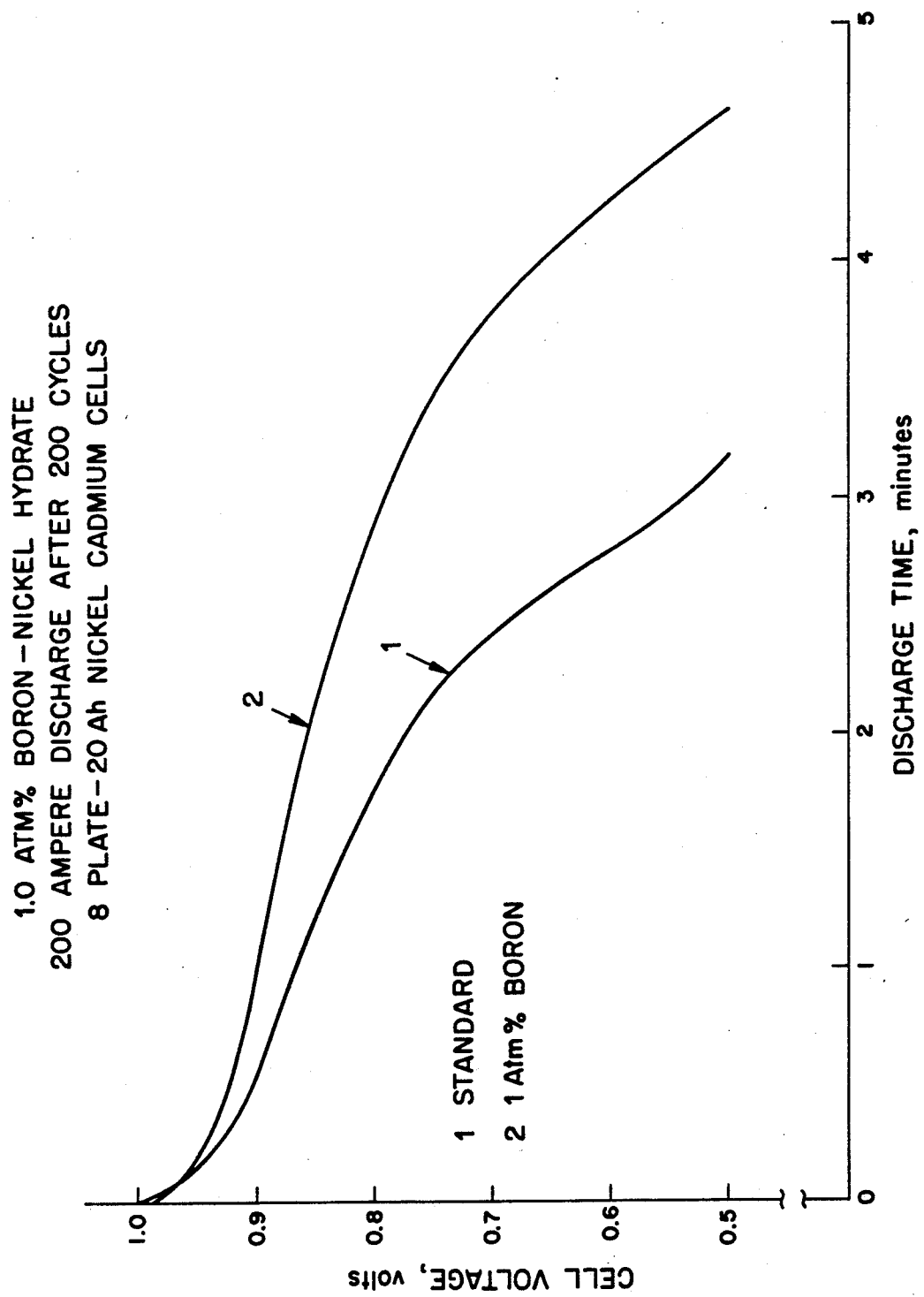
FIG. 2 shows discharge curves similar to those of FIG. 1 for like cells after 200 cycles of operation.
Figure 3:
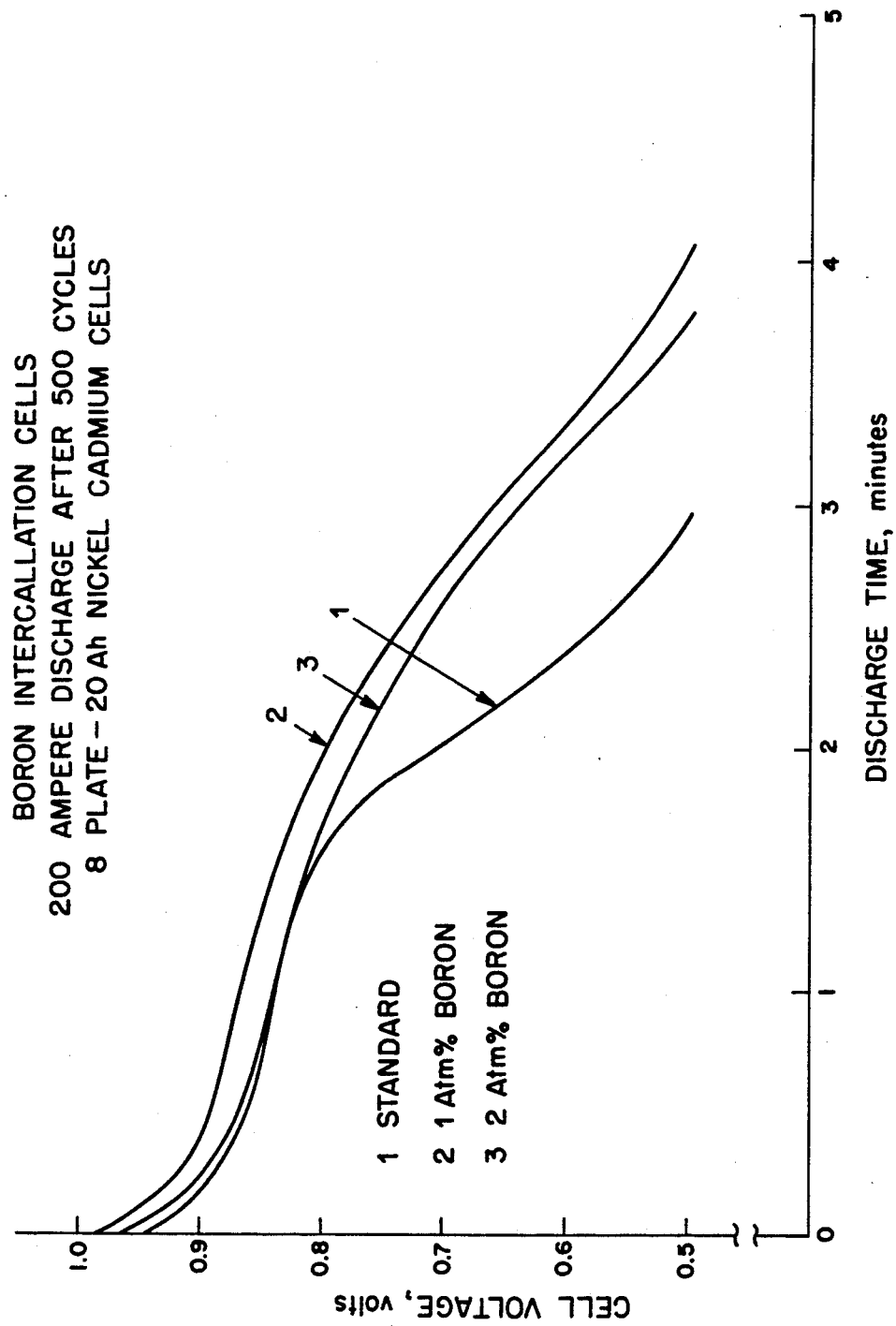
FIG. 3 also shows discharge curves similar to those of FIG. 1 for like cells after 500 cycles of operation.

FIG. 1 shows the discharge performance of the cell after 100 cycles, FIG. 2 shows the discharge performance after 200 cycles and FIG. 3 shows the performance after 500 cycles. As can be seen, throughout the test cycling the cell containing boron exhibited improved voltage and capacity retention as compared to a standard or control cell.

The control cell differed from the cell of the invention solely in respect of its positive active material composition. In particular, the positive active material of the control cell contained $Ni(OH)_2$ which was chemically prepared as above, but without any boron additive. Moreover, the initial ampere-hour capacity of the control cell was similar to the cell of the invention and the control cell was subjected to the same discharge-recharge cycling as previously described.

As seen from the figures, the voltage and capacity of the control cell deteriorated after 100 cycles when compared to the cell of the invention. Specifically the mid-point voltage was about 100 mV less and capacity about 20 percent lower for the control cell at the 200 ampere discharge rate. These differences were also apparent after 200 and 500 cycles.

The poorer performance of the control cell at the 200 ampere discharge rate during extended cycling is attributable to the poorer conductivity of the active material. This, in turn, is believed to be caused, in part, by the absence of significant amounts of conductive tetravalent nickel or other more conductive active species which are formed in the active material of the invention as result of the boron addition.

It should be noted that active $Ni(OH)_2$ containing boron may also be obtained by the addition of $Ni_3(BO_3)_2$ or boric oxide to the active material by admixing. Also, coprecipitated $Ni(OH)_2$ containing boron may be obtained by electrochemically oxidizing nickel in a salt (NaCl) solution containing boric acid.

In all cases it is understood that the above-identified arrangements and combinations are merely illustrative of the many possible specific embodiments which represent applications of the present invention. Numerous and varied other arrangements can readily be devised in accordance with the principles of the present invention without departing from the spirit and scope of the invention.

What is claimed is:

1. A nickel electrode comprising: an electrically conductive support; a layer on said support, said layer comprising a conductive diluent and active material including nickel hydroxide having 1–10% atom % boron contained within its crystalline lattice.

2. A electrode in accordance with claim 1 wherein: the boron is present as one of $BO_3^{-3}$ ions and $B^{+3}$ ions.

3. An electrode in accordance with claim 1 wherein: said boron is present in a compound of $Ni_3(BO_3)_2$.

4. An electrode in accordance with claim 1 wherein: said boron is present in a compound of $H_3BO_3$.

5. An electrode in accordance with claim 1 wherein: said conductive diluent is graphite.

6. An electrode in accordance with claim 5 further including: a binder included in said layer.

7. An electrode in accordance with claim 6 wherein: said binder comprises polytetrafluoroethylene.

8. An electrode in accordance with claim 1 wherein: said boron is present in an amount equal to 1–2 atom %.

9. A method for producing an $Ni(OH)_2$ material for use as the active material in a nickel electrode comprising: forming a solution from aqueous nickel salts, aqueous cobalt salts and boric acid; precipitating from said solution $Ni(OH)_2$ containing boron.

10. An active material for use in forming a nickel electrode comprising nickel hydroxide having 1–10 atom % boron contained within its crystalline lattice.

11. The active material of claim 10 wherein the atom % of boron is 1–2 atom %.

* * * * *

UNITED STATES PATENT AND TRADEMARK OFFICE
CERTIFICATE OF CORRECTION

PATENT NO. : 5,023,155
DATED : June 11, 1991
INVENTOR(S) : Allen Charkey and Stanley Januszkiewicz It is certified that error appears in the above-identified patent and that said Letters Patent is hereby corrected as shown below:

Col. 1, line 12.  After "other" insert -- materials as the anode active material. Certain of these --

Col. 2, line 1.  After "of" insert -- the atomic mass of the nickel hydroxide. A more preferable --

Col. 2, line 57.  Change "1-10%" to -- 1-10 atom % --

Col. 3, line 29.  Change "C." to -- C --

Col. 3, line 38.  Before "through" insert -- 60°C to dry. After drying the material was ground and sieved --

Col. 3, line 55.  Change "at" to -- a --

Col. 4, line 53.  After "as" insert -- a --

Col. 5, line 4.  Delete "%" first occurrence

Col. 5, line 6.  Change "A" to -- An --

Signed and Sealed this

Twenty-second Day of September, 1992

Attest:

DOUGLAS B. COMER

*Attesting Officer*   *Acting Commissioner of Patents and Trademarks*